No. 750,274. PATENTED JAN. 26, 1904.
C. GABRIELSON.
TYPE WRITING MACHINE.
APPLICATION FILED FEB. 18, 1903.
NO MODEL. 3 SHEETS—SHEET 3.
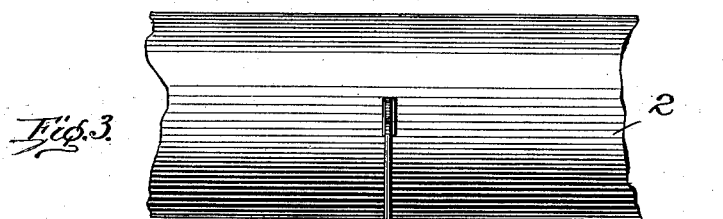
Fig. 3.
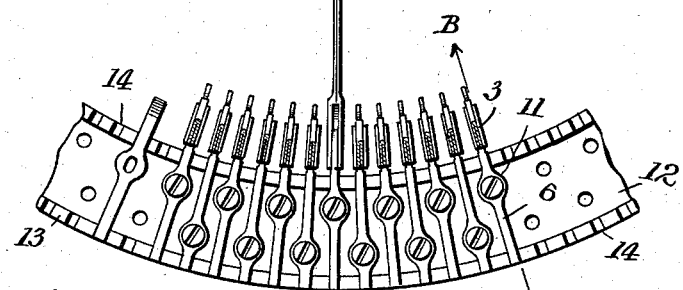
Fig. 4. 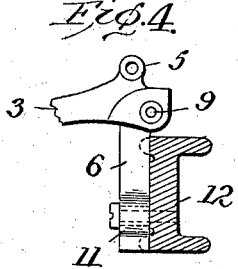 Fig. 5. 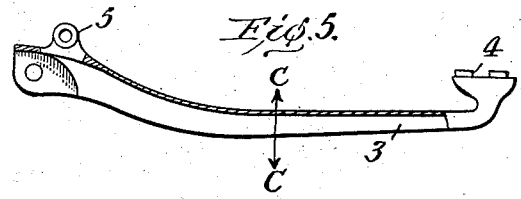
Fig. 8.  Fig. 6.  Fig. 7. 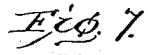
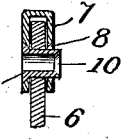 Fig. 9.  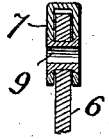
Witnesses
J. M. Fowler Jr.
C. W. Clement
Inventor
Carl Gabrielson
by J. H. Watson
Attorney No. 750,274. Patented January 26, 1904.

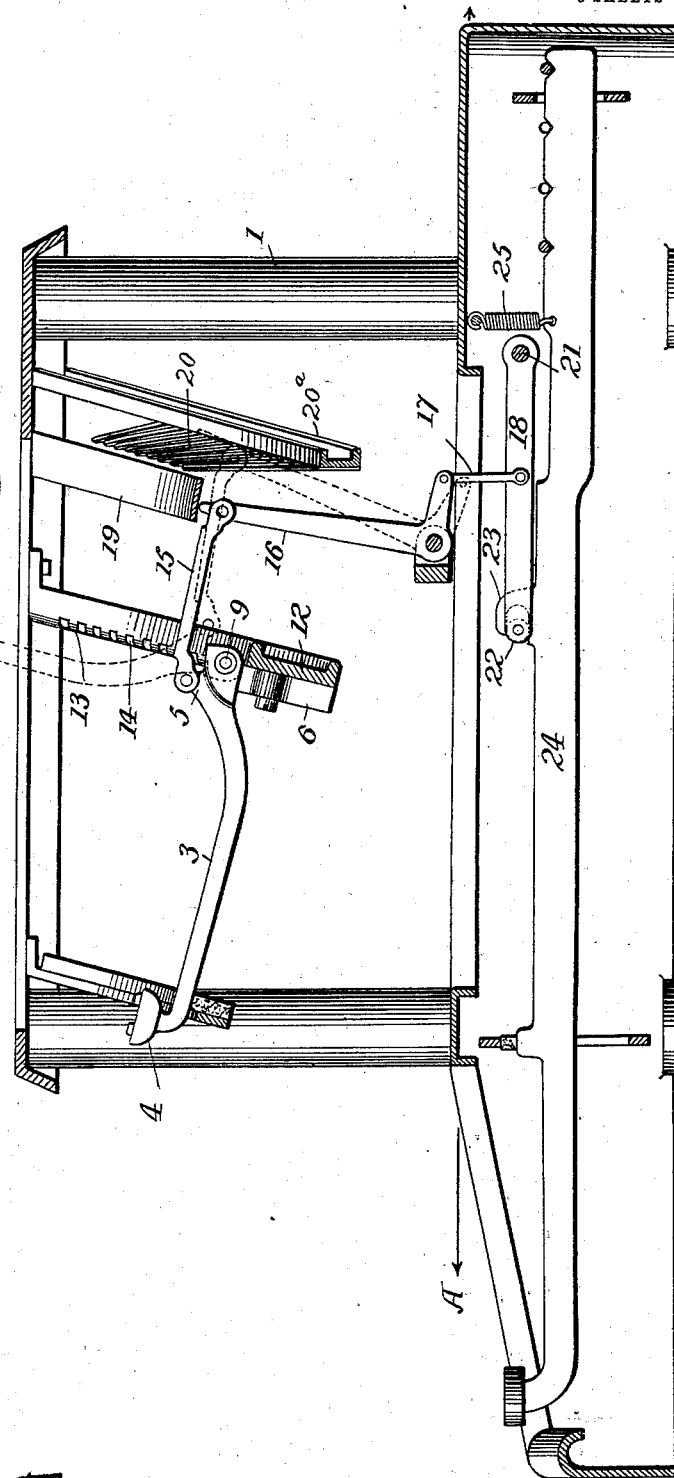

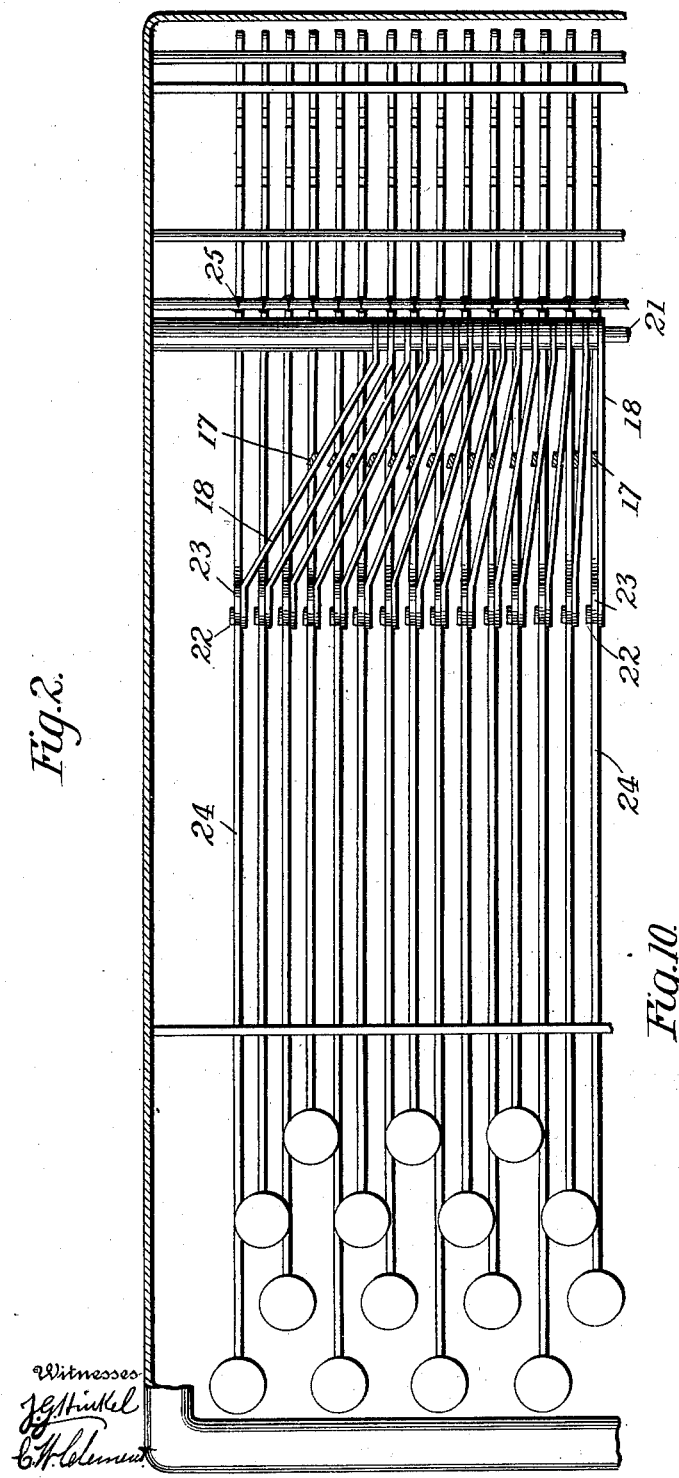
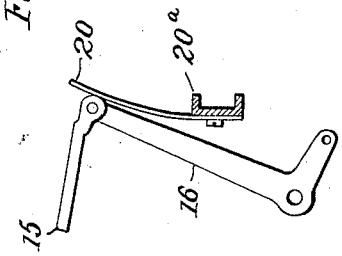
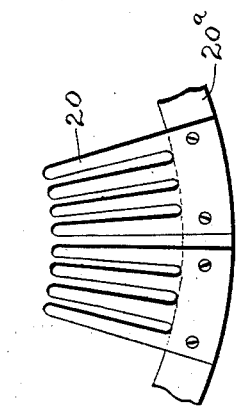

UNITED STATES PATENT OFFICE.

CARL GABRIELSON, OF WORCESTER, MASSACHUSETTS, ASSIGNOR TO L. C. SMITH AND BROS. TYPEWRITER COMPANY, OF SYRACUSE, NEW YORK, A CORPORATION OF NEW YORK.

TYPE-WRITING MACHINE.

SPECIFICATION forming part of Letters Patent No. 750,274, dated January 26, 1904.

Application filed February 18, 1903. Serial No. 143,896. (No model.)

*To all whom it may concern:*

Be it known that I, CARL GABRIELSON, a citizen of the United States, residing at Worcester, in the county of Worcester and State of Massachusetts, have invented certain new and useful Improvements in Type-Writing Machines, of which the following is a specification.

This invention comprises improvements in type-bar-operating mechanism of type-writing machines; and it has for its object to simplify the connections between the key and the type-bar and to improve the construction and action of said parts.

The invention will be fully described in connection with the accompanying drawings, in which—

Figure 1 is a central vertical section of a type-writing machine embodying my improvements, taken from front to rear. Fig. 2 is a plan view of half of the machine below the line A A of Fig. 1. Fig. 3 is a front elevation showing part of a platen and some of the type-bar hangers. Fig. 4 is a section on the line B B of Fig. 3. Fig. 5 is a side view of one of the type-bars, partly broken away to show the construction thereof. Fig. 6 is a section on the line C C of Fig. 5. Fig. 7 is a section taken centrally through the pivot of one of the type-bars. Fig. 8 is a similar view illustrating the method of connecting the type-bar to its hanger. Fig. 9 is a section showing the openings in the type-bar. Fig. 10 is a rear view of two sections of the repulsion-springs. Fig. 11 is a detail of Fig. 1.

Referring to the drawings, 1 indicates a suitable frame upon which the various operating parts of the machine are mounted, and 2 indicates the platen. To avoid confusion, I have omitted from the drawings various parts of the machine which do not relate to the present invention.

The type-bars 3 are preferably formed of sheet metal folded along a longitudinal central line, as shown in Figs. 5 and 6. The type 4 and the lugs 5 are rigidly connected to the type-bar in any suitable manner.

Each type-bar is pivoted to a hanger 6, preferably by the method illustrated in Figs. 7 and 8. Referring to said figures, it will be seen that the cheeks 7 of the type-bar are provided with opposite round openings 8, which are beveled or countersunk on the outer faces of the cheeks. An eyelet 9, having a beveled flange at one end and preferably an internally-beveled face at the other end, is passed through the type-bar and through the type-bar hanger 6, as shown in Fig. 8. After the parts are thus assembled the projecting end 10 of the eyelet is spun or pressed into the surrounding flared opening in the type-bar, as shown in Fig. 7. The pressure of the spinning device is regulated so as to produce the desired fit required between the type-bar and its hanger. If the space between the cheeks of the type-bar is too great, the pressure brought to bear upon the eyelet will bring said cheeks together as much as desired and create an accurate working fit between the type-bar and hanger. The parts should fit so that the type-bar shall have freedom of movement without looseness.

The type-bar hangers 6 are each formed with a swelled or enlarged portion 11, through a slot 11$^a$ in which a screw passes to connect it to the hanger-supporting bar or segment 12. The enlargements 11 are staggered, being differently located on adjacent hangers, so that they may be arranged closely on the support or segment 12. The supporting bar or segment 12 is preferably provided with flanges 13, in which are radial notches 14, adapted to receive the hangers. The slots 11$^a$ permit the hangers and type-bars to be adjusted radially to and from the printing-point. The hangers have solid bearing portions with opposite plain bearing-faces, which serve to guide the type-bar and prevent vibration, and the hollow rivets are upset sufficiently to produce a working fit of the type-bars upon these faces.

The pivotal ends of the type-bars are U-shaped and embrace the hangers, forming covers which protect the bearings from dirt falling from the platen when erasures are made, &c.

The connections between the type-bars and the key-levers comprise links 15, sublevers 16, links 17, and arms 18. The links 15 connect the eyes 5 of the type-bars with the upper ends of the sublevers 16. To prevent the links from accidentally disconnecting from the sublevers, I provide a guard 19, consisting of a curved plate.

The sublevers are elbow-levers or bell-cranks. The short horizontal arms of the sublevers are connected by the links 17 with the arms or levers 18. These latter, as shown, are pivoted at their rear ends to a bar 21, running across the machine. The forward ends of the arms 18 carry rolls 22, which engage slots or openings in projections 23 on the upper edges of the key-levers 24. It will be evident that when a key-lever is depressed the forward end of the arm 18 will be carried down, the sublever 16 rocked rearward, and the type-bar thrown up to the platen. The upper end of the sublever when thrown back strikes against a plate spring or tongue 20 upon a bar 20ª. The spring-tongues 20 are preferably make in groups, as shown in Fig. 10. When the key-lever is released, a spring 25 raises it, and the repulsing-spring 20 assists in restoring the parts to their inactive position. The key-lever may be connected to the machine-frame in any operative manner. The repulsing-springs 20 throw the type-bars away from the platen and prevent double impressions or shadowing.

The sublevers 16 are necessarily more closely arranged than the key-levers 24, and hence the levers 18 on each side of the center line of the machine must be arranged diagonally to connect the key-levers with the links 17. In order that the levers 18 may have no tendency to turn on their longitudinal axes, I arrange the three operative points of each lever 18 in a straight line—that is, the points at which it is connected to the key-lever, the link 17, and the bar 21. It will be seen that these points are in line with respect to each lever 18, although the levers differ in plan view.

Having described my invention, what I claim, and desire to secure by Letters Patent, is—

1. In a type-writing machine, the combination with a platen and a curved type-bar support below the platen, of a series of front-strike type-bars pivotally connected to said support, each of said type-bars consisting of a piece of sheet metal folded along a central line, the folded edge of the type-bar being arranged uppermost and the sides being separated at the pivotal end of the bar to receive the hanger, whereby the type-bar forms a shield for its bearing.

2. In a type-writing machine, the combination with a curved type-bar support, of a series of type-bar hangers detachably connected to said support and type-bars pivotally connected to said hangers, the said hangers having enlarged portions to receive fastening devices and the enlarged portions of adjacent hangers being staggered, whereby they may be closely arranged.

3. In a type-writing machine, the combina-with a solid type-bar hanger having opposite plain bearing-faces, of a type-bar having a section arranged to embrace the hanger, and a hollow rivet passing through said type-bar and hanger and arranged to connect the parts without lost motion, said rivet being upset or headed at both ends and thus permanently connected with the type-bar.

4. In a type-writing machine, the combination with a type-bar, a sublever and a link connecting said type-bar and sublever, of a key-lever, a horizontal arm mounted on a stationary pivot and operated from the key-lever, and a link connecting the arm with the sublever, said parts being connected without lost motion.

5. In a type-writing machine, the combination with a type-bar, a sublever, and a connecting-link, of a key-lever, a pivoted arm having a pin-and-slot connection with the key-lever and a link connecting said arm with the sublever.

6. In a type-writing machine, the combination with a series of front-strike type-bars, a series of right-angled sublevers, and links connecting the vertical arms of the sublevers with the type-bars, of a series of key-levers, a fan-shaped series of arms each pivoted at its rear end and having a sliding connection with the key-lever at its forward end, and links connecting the intermediate parts of said arms with the sublevers, the pivotal point of each arm and the points of its connection with the link and the key-lever being substantially in a straight line, for the purpose set forth.

In testimony whereof I affix my signature in presence of two witnesses.

CARL GABRIELSON.

Witnesses:
E. J. TITCOMB,
EDW. P. KING.